(12) United States Patent
Poppe et al.

(10) Patent No.: US 10,296,621 B2
(45) Date of Patent: May 21, 2019

(54) DATABASE AND DATA STREAM QUERY

(71) Applicant: Hewlett Packard Enterprise Development LP, Houston, TX (US)

(72) Inventors: Olga Poppe, Palo Alto, CA (US); Alkiviadis Simitsis, Santa Clara, CA (US); William Kevin Wilkinson, San Mateo, CA (US)

(73) Assignee: Hewlett Packard Enterprise Development LP, Houston, TX (US)

( * ) Notice: Subject to any disclaimer, the term of this patent is extended or adjusted under 35 U.S.C. 154(b) by 275 days.

(21) Appl. No.: 15/503,762

(22) PCT Filed: Sep. 30, 2014

(86) PCT No.: PCT/US2014/058483
§ 371 (c)(1),
(2) Date: Feb. 14, 2017

(87) PCT Pub. No.: WO2016/053322
PCT Pub. Date: Apr. 7, 2016

(65) Prior Publication Data
US 2017/0270166 A1 Sep. 21, 2017

(51) Int. Cl.
*G06F 17/30* (2006.01)
(52) U.S. Cl.
CPC .. *G06F 17/30516* (2013.01); *G06F 17/30424* (2013.01); *G06F 17/30427* (2013.01); *G06F 17/30483* (2013.01); *G06F 17/30554* (2013.01)

(58) Field of Classification Search
CPC ......... G06F 17/30516; G06F 17/30424; G06F 17/30427; G06F 17/30483; G06F 17/30554
See application file for complete search history.

(56) References Cited

U.S. PATENT DOCUMENTS 6,574,639 B2 6/2003 Carey et al.
7,403,959 B2 7/2008 Nishizawa et al.
(Continued)

OTHER PUBLICATIONS

Hu, "Formal Specification of Bounded Buffer using Stream Functions.", Aug. 2009, 7 pages. (Year: 2009).*
(Continued)

*Primary Examiner* — Yonas A Bayou
(74) *Attorney, Agent, or Firm* — Hewlett Packard Enterprise Patent Department

(57) ABSTRACT

Example implementations relate to a database and a data stream query. For example, a computing device may include a processor. The processor may receive a query associated with at least one of a database and a buffer storing streamed data from a data stream, where the database stores database data previously stored in the buffer. The processor may identify at least one postponed command relevant to the query, the at least one postponed command being associated with at least one of the database data and the streamed data. The processor may generate a modified query based on the query and the at least one postponed command, the modified query being a modification of the query to account for the at least one postponed command. The processor may process the modified query and provide a query result of the query based on the modified query being processed.

15 Claims, 3 Drawing Sheets

(56) References Cited

U.S. PATENT DOCUMENTS

| | | | |
|---|---|---|---|
| 7,860,884 B2 | 12/2010 | Lee et al. | |
| 8,396,886 B1 | 3/2013 | Tsimelzon et al. | |
| 8,495,417 B2 | 7/2013 | Jernigan et al. | |
| 9,256,646 B2 * | 2/2016 | Deshmukh | G06F 17/30442 |
| 9,262,479 B2 * | 2/2016 | Deshmukh | G06F 17/30463 |
| 9,390,135 B2 * | 7/2016 | Alves | G06F 17/30548 |
| 9,508,083 B2 * | 11/2016 | Yaseen | G06F 17/30 |
| 9,515,965 B2 * | 12/2016 | Branson | H04L 45/24 |
| 9,520,962 B2 * | 12/2016 | Xia | H04L 41/0627 |
| 9,715,561 B2 * | 7/2017 | Barsness | H04L 41/22 |
| 2009/0019198 A1 * | 1/2009 | Konik | G06F 17/30477 710/59 |
| 2009/0106214 A1 * | 4/2009 | Jain | G06F 17/30516 |
| 2011/0055239 A1 * | 3/2011 | Wolf | G06F 17/30516 707/759 |
| 2012/0166421 A1 * | 6/2012 | Cammert | G06F 17/30474 707/718 |
| 2013/0091123 A1 | 4/2013 | Chen et al. | |
| 2013/0198166 A1 * | 8/2013 | Prout | G06F 17/30442 707/718 |
| 2014/0222523 A1 * | 8/2014 | Vairavan | G06Q 10/0637 705/7.36 |

OTHER PUBLICATIONS

PCT; "Notification of Transmittal of the International Search Report and the Written Opinion of the International Searching Authority, or the Declaration": cited in PCT/US2014/058483; dated May 27, 2015; 9 pages.

Pierre, G.; "Aggregate Queries in NoSQL Cloud Data Stores"; Aug. 5, 2011; http://www.globule.org/publi/AQNCDS_master2011.pdf.

* cited by examiner

DATABASE AND DATA STREAM QUERY

BACKGROUND

Many entities (e.g., enterprises, organizations, computer applications, etc.) utilize databases for storage of data relating to the entities. The data in a database may be received from a data stream of incoming data. Data stored in these databases may be accessed and analyzed for various purposes.

BRIEF DESCRIPTION OF THE DRAWINGS

Some examples of the present application are described with respect to the following figures.

DETAILED DESCRIPTION

Figure 1:
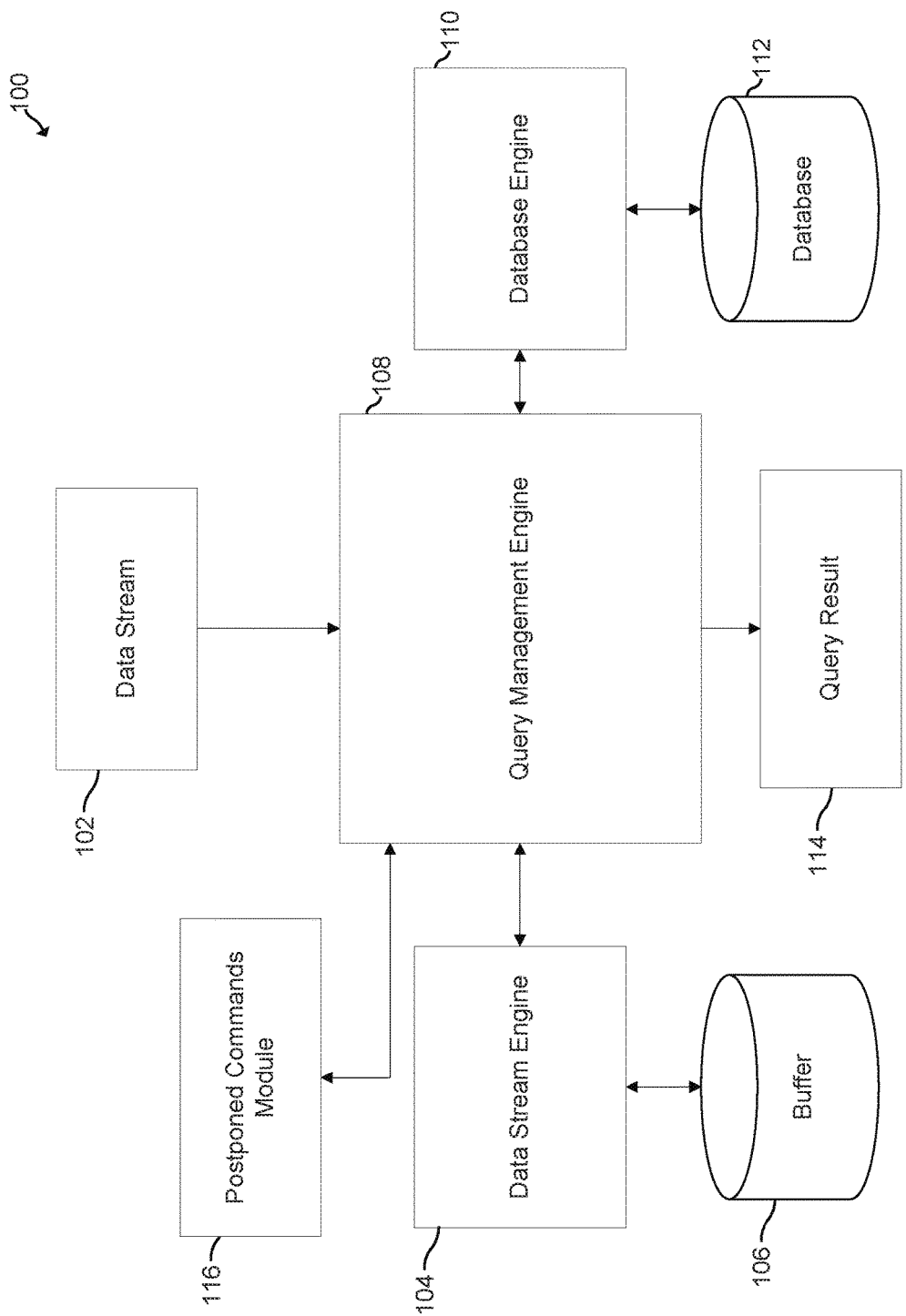
FIG. 1 is a block diagram of an example system for processing a database and data stream query.

As described above, data stored in a database may be accessed and analyzed for various purposes. A query of the data in the database may indicate a particular set of data that is being requested. For example, a user may wish to analyze sales for a particular time range and may query the database for this particular set of sales data. However, for databases receiving incoming data from a data stream, a query for a set of data from the database alone may produce inaccurate results if the data in the database is not fresh. For example, the incoming data stream may include and/or specify modifications in the form of raw data and/or commands, such as updates, insertions, deletions, and the like, to at least a portion of the database, where those modifications may not be reflected in the results of the query if the database has not yet been modified by the data in the data stream.

To more efficiently and accurately run a query associated with a database and an incoming data stream that may modify the database data (e.g., insert, delete, and/or update database data), commands that have not yet been applied to the database and/or the data stream (e.g., postponed commands, such as insert commands, update commands, and/or delete commands) may be identified if those commands are relevant to the query. Postponed commands may be commands, such as insert, update, and/or delete commands, that may be delayed from being executed for any suitable amount of time (e.g., based on user-specified criteria). Postponing these commands from being executed after they have been received through the data stream may save time and resources, as performing these commands each time they are received may be inefficient. The identified postponed commands may be given priority relative to other commands and may be used to generated a modified query, which may be a modification of the original query modified based on the relevant commands identified. The modified query may be processed using a database engine managing the database and/or a data stream engine managing the data stream. The query may be any suitable type of query, such as a discrete query, a continuous query, and the like. A discrete query may be a query with a fixed, static range delimited by time or count values. A continuous query may be a query with a series of ranges or windows such that a query result is computed over a particular range, the range (e.g., its lower and upper bounds) is subsequently moved by some specified amount (e.g., a "sliding" window), and the query is recomputed over the newly defined range, where this process may be repeated until some termination condition is reached. For example, a discrete query may request data for sales from the previous month. If there are any postponed commands that are associated with data from the previous month, those commands may be used to generate a modified query that may be based on the commands and the original query, where the results to the modified query may be provided in response to the original query. In some examples, these techniques may be performed by an application in communication with and running on top of a data stream engine and a database engine.

The postponed commands that are relevant to the received query may be determined and identified in any suitable manner. In some examples, the postponed commands may be identified based on a range specified in the query, such as a time range, a range associated with a count of events, and the like. For example, a query may request data associated with a time range that is the previous month, and any postponed commands associated with that time range may be identified, prioritized, and accounted for in a modification to the query that may be processed to provide results to the query.

While the examples provided herein are described with respect to databases, one of ordinary skill in the art will recognize that a similar approach may be used in any suitable context (e.g., Apache™ Hadoop®). Additionally, while the examples provided herein are described with respect to a single database and a single data stream, one of ordinary skill in the art will recognize that a similar approach may be used for any number of data streams targeting any number of databases, possibly distributed across several compute nodes (e.g., database-as-a-service). In some examples, the techniques disclosed herein may be capable of querying any suitable execution engine external to the memory structure (e.g., data stream buffer). For example, data may be stored in disks (e.g., cold data) and may be modified (e.g., data inserted, deleted, updated, etc.), and the techniques disclosed herein may be capable of querying an in-memory structure and/or a disk-based storage.

Referring now to the figures, FIG. 1 is a block diagram of an example system 100 for processing a database and data stream query. Data stream 102 may include any suitable type of data that may include queries (e.g., a structured query language (SQL) query) specifying a request for a particular set of data that may be stored in database 112 or buffer 106, data commands (e.g., insert, delete, and/or update commands), and the like.

Data stream engine 104 may be a hardware-implemented and/or processor-implemented processing engine that may manage and control receipt of inserted data from one or more insert commands received from data stream 102. Before inserted data from data stream 102 is sent to database 112, data stream engine 104 may store the data in buffer 106, which may be any suitable type of storage device. Data stream engine 104 may manage and control receipt and processing of queries that may query data in buffer 106.

Additionally, update and/or delete commands from data stream 102 may be stored in postponed commands module 116, which may be a module and/or storage device storing commands (e.g., insert commands, update commands, delete commands, etc.) that have not yet been sent to and processed by data stream engine 104 and/or database engine 110. The postponed commands may be postponed by query management engine 110 by storing the commands in postponed commands module 116 based on any suitable criteria (e.g., criteria used to determine which commands to postpone, how long to postpone the commands, etc.). For example, the commands may be postponed from being processed by data stream engine 104 and/or database engine 110 based on user-specified criteria, such as a time criteria, event criteria, and the like. For example, commands may be stored in postponed command module 116 until a specified amount of time has passed, until a specified amount of storage has been filled with commands, and the like.

Database engine 110 may be a hardware-implemented and/or processor-implemented processing engine that may manage and control receipt and processing of queries that may request data stored in database 112, which may be any suitable type of storage device. Database engine 110 may also manage and control receipt of data from the data stream and may manage and control storage of the data in database 112.

Query management engine 108 may be a hardware-implemented and/or processor-implemented processing engine that may manage and control the processing of queries (e.g., discrete or continuous queries), such as a query from data stream 102. In some examples, query management engine 108 may be an application that may be in communication with and external to data stream engine 104 and database engine 110 such that the functions of query management engine 108 may be performed without modification to data stream engine 104 and database engine 110. Query management engine 108 may receive a query from data stream 102 and may identify postponed commands in postponed commands module 116 that may be relevant to the query. For example, query management engine 108 may determine that a particular set of commands in postponed commands module 116 pertains to the query. Query management engine 108 may modify the query based on the relevant postponed commands to generate a modified query. The modified query may be processed, and the result of the modified query (e.g., query result 114) may be provided in response to the query.

If a query from data stream 102 is a continuous query, query management engine 108 may treat the query as an unbounded series of discrete queries that may be called periodically. For example, instead of waiting to update data in the database before computing query result 114, query management engine 108 may maintain the result of the query based on the stored data and incrementally update it based on the data changes in the buffer, as monitored by query management engine 108. For new records, the aggregated results may be updated on the fly.

In some examples, a query may be a SQL query, and data may reside on persistent storage in a relation inside a database. A query result to the query may be calculated despite any changes to data in the database based on modifications (e.g., insertions, deletions, updates, etc.) from a data stream. Table 1 below presents an example syntax of queries and operations that may be used with the techniques disclosed herein:

TABLE 1

Example aggregation query and insert/delete/update operations

| Aggregation Query | Insert | Delete | Update |
|---|---|---|---|
| SELECT G, AGG(A) FROM $R_q$ WHERE $P_q$ | INSERT INTO $R_i$ VALUES V | DELETE FROM $R_d$ WHERE $P_d$ | UPDATE $R_u$ SET S WHERE $P_u$ |

TABLE 1-continued

Example aggregation query and insert/delete/update operations

| Aggregation Query | Insert | Delete | Update |
|---|---|---|---|
| GROUP BY G WINDOW $W_q$ | | WINDOW $W_d$ | WINDOW $W_u$ | where A is an attribute name,
G is a set of attribute names,
V is a set of tuples. AGG ∈ {min, max, sum, count} is an aggregation function,
$R_q$, $R_i$, $R_d$, and $R_u$ are relations, S is a predicate of the form <attribute name> "=" <constant>, $P_q$, $P_d$, and $P_u$ are conjunctions of atomic predicates, e.g., predicates of the form <attribute name> {"<"|">"|"="|"≠"} <constant>,
$W_q$, $W_d$ and $W_u$ are windows.

The data stream data relevant to the query may be identified and executed before the query is processed using the database. Example correlations between parameters introduced in Table 1 may be considered, and the following classes that may be relevant to the query may be identified as follows:

Postpone delete and/or update operation without modifying the query because the delete and/or update operation, respectively, does not change the data accessed by the query Postpone delete and/or update operation and conclude that the query has no results without accessing the data (e.g., all data relevant for the query is deleted)

Postpone delete and/or update operation and modify the query such that the modified query returns the same results as if delete and/or update operations, respectively, were performed prior to query execution If none of the above applies or does not improve performance, a delete and/or update operation may be processed before the query is evaluated.

In some examples, a query relation $R_q$ may be compared to a delete and/or update relation $R_{d/u}$. If $R_q$ and $R_{d/u}$ are not the same relation, the query and delete and/or update operation may not access the same data. As such, the delete and/or update operation may be postponed without affecting the query because the query is not affected by this data change.

In some examples, a query window $W_q$ may be compared to the window $W_{d/u}$ of a delete and/or update operation. If $W_q$ and $W_{d/u}$ do not overlap, the query and delete and/or update operation may not access the same data. As such, the delete and/or update operation may be postponed without affecting the query because the query is not affected by this data change. The relation between windows may depend on when the query or the delete and/or update operation was received. In the examples described in the tables below, it may be assumed that the windows begin at the same time. If $W_q$ and $W_{d/u}$ are of different types (e.g., count-based and time-based), $W_{d/u}$ may be converted to the type of $W_q$ (e.g. 100 relevant tuples within 5 minutes). In the examples described in the tables below, it may be assumed that $W_q$ and $W_{d/u}$ are of the same type (e.g., both count-based, both time-based, etc.).

In some examples, query predicate $P_q$ may be compared to the predicate $P_d$ of a delete operation, and query window $W_q$ may be compared to the window $W_d$ of a delete operation. For example, consider the following query that computes the total price of orders with prices exceeding $1000 per customer within a day (e.g., 24 hours):

SELECT CustomerID, SUM(Price)
FROM Orders
WHERE Price>1000
GROUP BY CustomerID
WINDOW Range 1 day Furthermore, consider the different cases shown in Table 2 below:

TABLE 2

Example correlations between $P_q$ and $P_d$, and $W_q$ and $W_d$

| Case N° | $P_q$ vs. $P_d$ | $W_q$ vs. $W_d$ | Comment | Action |
|---|---|---|---|---|
| 1 | $(P_q \wedge P_d)$ is not satisfiable | — | Query and delete operation does not access the same data | — |
| 2 | $P_q \subseteq P_d$ | $W_q \subseteq W_d$ | All tuples relevant for the query are deleted within whole $W_q$ | The query has no results |
| 3 | | $W_q \cap W_d \neq 0$ and $W_q$ is not $\subseteq W_d$ | All tuples relevant for the query are deleted within part of $W_q$ | Modify query window $(W_q - W_d)$ |
| 4 | $(P_q \wedge P_d)$ is satisfiable and $P_q$ is not $\subset P_d$ | $W_q \subseteq W_d$ | Some tuples relevant for the query are deleted within whole $W_q$ | Modify query predicate $(P_q \wedge \neg P_d)$ |
| 5 | | $W_q \cap W_d \neq 0$ and $W_q$ is not $\subseteq W_d$ | Some tuples relevant for the query are deleted within part of $W_q$ | Evaluate 2 queries: First with predicate $(P_q \wedge \neg P_d)$ and window $(W_q \wedge W_d)$, second with predicate $P_q$ and window $(W_q - W_d)$. Combine their results |

An example of Case 1 in Table 2 above is as follows, which is an example operation to delete all orders with a price smaller than $10 within a day:

DELETE FROM Orders WHERE Price<10 WINDOW Range 1 day

Even though the query and the delete statement above operate on the same relation within the same period of time, they may never access the same tuples of the relation because the predicates are mutually exclusive. As such, this delete operation may be postponed without affecting the query.

An example of Case 2 in Table 2 above is as follows, which is an example operation to delete all orders with a price greater than $100 within 3 days:

DELETE FROM Orders WHERE Price>100 WINDOW Range 3 days

This statement deletes all tuples relevant for the query within the whole query window. As such, the query may have no results without immediately performing the delete and evaluating the query.

An example of Case 3 in Table 2 above is as follows, which is an example operation to delete all orders with a price greater than $100 dollars within 12 hours:

DELETE FROM Orders WHERE Price>100 WINDOW Range 12 hours

This statement deletes all tuples relevant for the query within half of the query window. As such, the query window may be modified to disregard deleted tuples as follows:

SELECT CustomerID, SUM(Price)
FROM Orders
WHERE Price>1000
GROUP BY CustomerID
WINDOW Interval now( )-12 hours, now( )-1 day An example of Case 4 in Table 2 above is as follows, which is an example operation to delete all orders with CustomerID1 and a price greater than $100 within 3 days:

DELETE FROM Orders WHERE CustomerID=1 AND Price>100 WINDOW Range 3 days

This delete statement deletes some tuples relevant for the query (e.g., those with CustomerID 1) within the whole query window. As such, the query predicates may be modified to disregard deleted tuples as follows:

SELECT CustomerID, SUM(Price)
FROM Orders
WHERE Price>1000 AND CustomerID!=1
GROUP BY CustomerID
WINDOW Range 1 day An example of Case 5 in Table 2 above is as follows, which is an example operation to delete all orders with CustomerID 1 and price greater than $100 within 12 hours:

DELETE FROM Orders WHERE CustomerID=1 AND Price>100 WINDOW Range 12 hours

This statement deletes some tuples relevant for the query (e.g., those with CustomerID 1) within half of the query window. As such, a query may be evaluated with the same predicates on the time interval, which is not affected by the delete operation, as follows:

SELECT CustomerID, SUM(Price)
FROM Orders
WHERE Price>1000
GROUP BY CustomerID
WINDOW Interval now( )-12 hours, now( )-1 day In addition, the query predicates may be modified to disregard deleted tuples within the time interval, which is affected by the delete operation, as follows:

SELECT CustomerID, SUM(Price)
FROM Orders
WHERE Price>1000 AND CustomerID!=1
GROUP BY CustomerID
WINDOW Range 12 hours The results of these two operations may be combined to arrive at the query result of the original query.

Referring back to Table 1, in some examples, query predicate $P_q$, GROUP BY clause G, and aggregate attribute A may be compared to the predicate $P_u$ and SET clause S of an update operation. Additionally, query window $W_q$ may be compared to the window $W_u$ of an update operation. These examples may be explained with respect to Table 3 below:

TABLE 3

Example correlations between $P_q$, G, A vs. $P_u$, S and $W_q$ vs. $W_u$

| Case N° | $P_q$, G, A vs $P_u$, S | $W_q$ vs. $W_u$ | Comment | Action |
|---|---|---|---|---|
| 1 | S sets no attributes accessed by $P_q$, G, A | — | Query and update operation does not access the same data | — |
| 2 | $(P_q \wedge P_u)$ is not satisfiable and no tuple with the same attribute values as S can satisfy $P_q$ | | | |
| 3 | $P_q \subseteq P_u$ and no tuple with the same attribute values as S can satisfy $P_q$ | $W_q \subseteq W_u$ | All tuples relevant for the query become irrelevant within whole $W_q$ | The query has no results |
| 4 | | $W_q \cap W_u \neq 0$ and $W_q$ is not $\subseteq W_u$ | All tuples relevant for the query become irrelevant within part of $W_q$ | Modify query window $(W_q - W_u)$ |
| 5 | $(P_q \wedge P_u)$ is satisfiable, $P_q$ is not $\subseteq P_u$, and no tuple with the same attribute values as S can satisfy $P_q$ | $W_q \subseteq W_u$ | Some tuples become irrelevant for the query within whole $W_q$ | Modify query predicate $(P_q \wedge \neg P_u)$ |
| 6 | | $W_q \cap W_u \neq 0$ and $W_q$ is not $\subseteq W_u$ | Some tuples become irrelevant for the query within part of $W_q$ | Evaluate 2 queries: First with predicate $(P_q \wedge \neg P_u)$ and window $(W_q \wedge W_u)$, second with predicate $P_q$ and window $(W_q - W_u)$. Combine their results. |

An example of Case 1 in Table 3 above is as follows, which is an example update operation to set the quantity attribute of all orders with CustomerID=1 within a day:

UPDATE Orders SET Quantity=3 WHERE CustomerID=1 WINDOW Range 1 day

Even though the query and the update statement above may access the same tuples, the changes of the update operation are irrelevant for the query. As such, the update operation may be postponed without affecting the query.

An example of Case 2 in Table 3 above is as follows, which is an example update operation to set the price attribute to $10 for all orders with a price less than $10 within a day:

UPDATE Orders SET Price=10 WHERE Price<10 WINDOW Range 1 day

Even though the query and the update statement above may operate on the same relation within the same period of time, they may not access the same tuples of the relation because the predicates are mutually exclusive. Furthermore, the tuples changed by the update operation remain irrelevant for the query. As such, the update operation may be postponed without affecting the query.

An example of Case 3 in Table 3 above is as follows, which is an example update operation to set the price attribute to $10 for all orders with a price greater than $100 within 3 days:

UPDATE Orders SET Price=10 WHERE Price>100 Window Range 3 days

This statement makes all tuples that were relevant for the query irrelevant within the whole query window. As such, it may be concluded that the query has no results without immediately performing the update and evaluating the query.

An example of Case 4 in Table 3 above is as follows, which is an example update operation to set the price attribute to $10 for all orders with a price greater than $100 within 12 hours:

UPDATE Orders SET Price=10 WHERE Price>100 WINDOW Range 12 hours

This statement makes all tuples that were relevant for the query irrelevant within half of the query window. As such, the query window may be modified to disregard the updated tuples as follows:

SELECT CustomerID, SUM(Price)
FROM Orders
WHERE Price>1000
GROUP BY CustomerID
WINDOW Interval now( )-12 hours, now( )-1 day An example of Case 5 in Table 3 above is as follows, which is an example update operation to set the price attribute to $10 for all orders with a price greater than $1100 within 3 days:

UPDATE Orders SET Price=10 WHERE Price>1100 WINDOW Range 3 days

This statement makes some tuples (e.g., those with a price greater than $1100) that were relevant for the query irrelevant within the whole query window. As such, the query predicates may be modified to disregard updated tuples as follows:

SELECT CustomerID, SUM(Price)
FROM Orders
WHERE Price>1000 AND Price<=1100
GROUP BY CustomerID
WINDOW Range 1 day An example of Case 6 in Table 3 above is as follows, which is an example update operation to set the price attribute to $10 for all orders with a price greater than $1100 within 12 hours:

UPDATE Orders SET Price=10 WHERE Price>1100 WINDOW Range 12 hours

This statement makes some tuples (e.g., those with a price greater than $1100) that were relevant for the query irrelevant within half of the query window. As such, a query may be evaluated with the same predicates on the time interval, which is not affected by the update, as follows:

SELECT CustomerID, SUM(Price)
FROM Orders
WHERE Price>1000
GROUP BY CustomerID
WINDOW Interval now( )-12 hours, now( )-1 day Additionally, the query predicates may be modified to disregard updated tuples within the time interval, which is not affected by the update, as follows:

SELECT CustomerID, SUM(Price)
FROM Orders
WHERE Price>1000 AND Price<=1100
GROUP BY CustomerID
WINDOW Range 12 hours The results of these two operations may be combined to arrive at the query result of the original query.

In contrast to Table 2, Table 3 does not present all of the possible cases. In some examples, in other cases not presented in Table 3, an update statement may be performed before the query may be evaluated. For example:

UPDATE Orders SET Price=1001 WHERE Price=1000 Window Range 12 hours

UPDATE Orders SET CustomerID=1 WHERE CustomerID=2 Window Range 12 hours

In some examples, when there are multiple data change actions, such as multiple update operations, these multiple statements may be optimized. For example, statements may be optimized by merging consecutive modification operations over a relation. For example, consider the following two consecutive updates:

UPDATE R Set status=gold where income>500000
UPDATE R Set status=gold where income>400000

The second statement subsumes the first statement, so the first update may be ignored when evaluating queries. In some examples, a similar case analysis may be applied to pending updates to reduce the amount of work to be performed when evaluating queries against the full data stream of all changes in the buffer.

Figure 2:
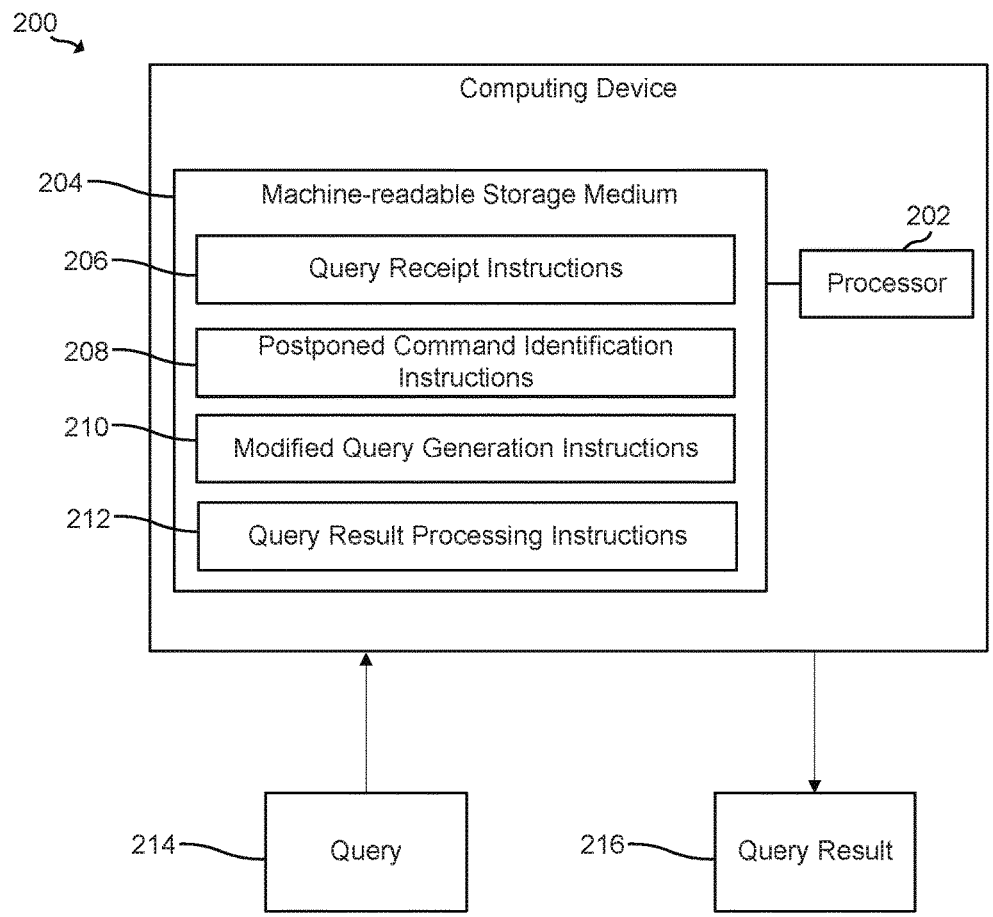
FIG. 2 is a block diagram of a computing device for processing a database and data stream query.

FIG. 2 is a block diagram of an example computing device 200 for processing a database and data stream query 214. The query 214 may be processed by identifying postponed commands relevant to query 214 and modifying query 214 based on the postponed commands.

Computing device 200 may be, for example, a web-based server, a local area network server, a cloud-based server, a notebook computer, a desktop computer, an all-in-one system, a tablet computing device, a mobile phone, an electronic book reader, a printing device, or any other electronic device suitable for processing a query (e.g., query 214) of a database and a data stream. Computing device 200 may include a processor 202 and a machine-readable storage medium 204. Computing device 200 may identify postponed commands relevant to query 214, generate a modified query based on the postponed commands, and process the modified query to produce query result 216.

Processor 202 is a tangible hardware component that may be a central processing unit (CPU), a semiconductor-based microprocessor, and/or other hardware devices suitable for retrieval and execution of instructions stored in machine-readable storage medium 204. Processor 202 may fetch, decode, and execute instructions 206, 208, 210, and 212 to control a process of processing a query of a database and a data stream. As an alternative or in addition to retrieving and executing instructions, processor 202 may include at least one electronic circuit that includes electronic components for performing the functionality of instructions 206, 208, 210, 212, or a combination thereof.

Machine-readable storage medium 204 may be any electronic, magnetic, optical, or other physical storage device that contains or stores executable instructions. Thus, machine-readable storage medium 204 may be, for example, Random Access Memory (RAM), an Electrically Erasable Programmable Read-Only Memory (EEPROM), a storage device, an optical disc, and the like. In some examples, machine-readable storage medium 204 may be a non-transitory storage medium, where the term "non-transitory" does not encompass transitory propagating signals. As described in detail below, machine-readable storage medium 204 may be encoded with a series of processor executable instructions 206, 208, 210, and 212 for receiving a query (e.g., query 214) associated with at least one of a database and a buffer storing streamed data from a data stream, the database storing database data previously stored in the buffer; identifying at least one postponed command received from the data stream and being relevant to the query, the at least one postponed command being delayed from execution and being associated with at least one of the database data and the streamed data; generating a modified query based on the query and the at least one postponed command, where the modified query is a modification of the query to account for the at least one postponed command; processing the modified query; and providing a query result of the query based on the modified query being processed.

Query receipt instructions 206 may manage and control receipt of queries, such as query 214. Query 214 may indicate a particular set of data being requested with respect to at least one of a database of data and/or a data stream of data that may update the database. Data from the data stream may be stored in a buffer before being sent to the database. For example, query receipt instructions 206 may manage and control receipt of query 214 requested from a user.

Postponed command identification instructions 208 may manage and control the identification and/or determination of postponed commands that may be associated with the received query. For example, commands that may be postponed (e.g., not yet applied to the database data or the data stream data) may be identified if the commands are relevant to query 214. The postponed commands may be relevant to the query if the commands may be applied to data requested by the query. For example, postponed commands may be relevant to query 214 if the commands are associated with a range specified by query 214 (e.g., count range, time range, etc.).

Modified query generation instructions 210 may manage and control the generation of a modified query that may be a modification of the query to account for the postponed commands relevant to the query. For example, a modified query may be generated by modifying query 214 to account for relevant postponed commands. In some examples, the modified query may include a sub-query relevant to and processed using the database and a sub-query relevant to and processed using the data stream data.

Query result processing instructions 212 may manage and control the processing of the modified query to generate query result 216 and may provide query result 216 in response to query 214. For example, query result processing instructions 212 may process the modified query and may return results (e.g., query result 216) based on the modified query being processed. In examples in which the modified query includes a sub-query relevant to and processed using the database and a sub-query relevant to and processed using the data stream data, the sub-queries may be processed and the results may be combined to produce query result 216.

Figure 3:
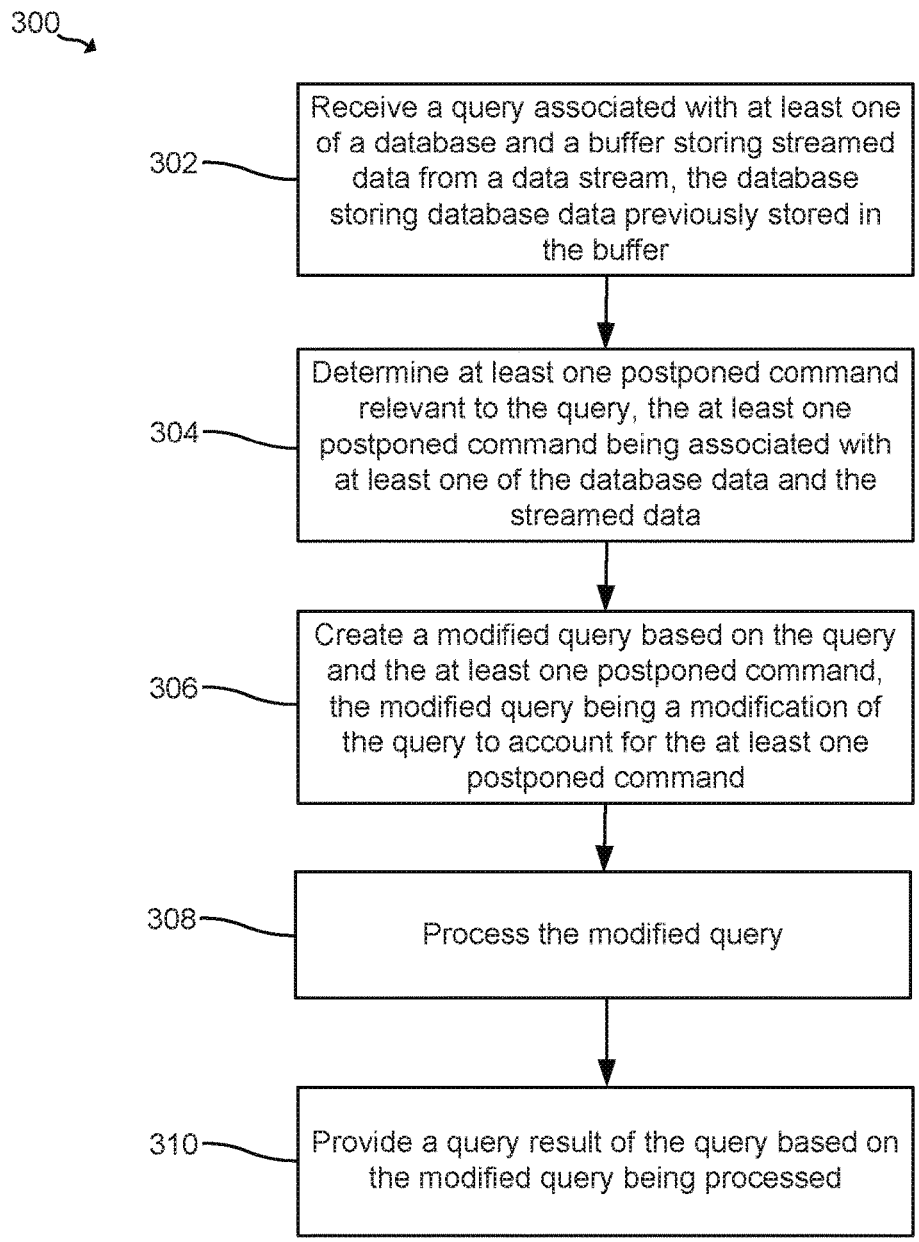
FIG. 3 is a flowchart illustrating an example method of processing a database and data stream query.

FIG. 3 is a flowchart illustrating an example method 300 of processing a database and data stream query. Method 300 may be implemented using computing device 200 of FIG. 2.

Method 300 includes, at 302, receiving a query associated with at least one of a database and a buffer storing streamed data from a data stream, the database storing database data previously stored in the buffer. The query received may be any type of query specifying a request for data with respect to the database and/or the data stream.

Method 300 also includes, at 304, determining at least one postponed command relevant to the query, the at least one postponed command being associated with at least one of the database data and the streamed data. For example, any postponed commands that may be relevant to the query may be determined and identified.

Method 300 also includes, at 306, creating a modified query based on the query and the at least one postponed command, the modified query being a modification of the query to account for the at least one postponed command. For example, a modified query may be created by accounting for the at least one postponed command identified.

Method 300 also includes, at 308, processing the modified query. For example, the modified query may be processed using the database data and/or the data stream data.

Method 300 also includes, at 310, providing a query result of the query based on the modified query being processed. For example, the results of the modified query may be provided. In some examples, if the modified query includes a sub-query relevant to and processed using the database and a sub-query relevant to and processed using the data stream data, the results of the sub-queries may be combined and provided as the query result.

Examples provided herein (e.g., methods) may be implemented in hardware, software, or a combination of both. Example systems may include a controller/processor and memory resources for executing instructions stored in a tangible non-transitory medium (e.g., volatile memory, non-volatile memory, and/or machine-readable media). Non-transitory machine-readable media can be tangible and have machine-readable instructions stored thereon that are executable by a processor to implement examples according to the present disclosure.

An example system can include and/or receive a tangible non-transitory machine-readable medium storing a set of machine-readable instructions (e.g., software). As used herein, the controller/processor can include one or a plurality of processors such as in a parallel processing system. The memory can include memory addressable by the processor for execution of machine-readable instructions. The machine-readable medium can include volatile and/or non-volatile memory such as a random access memory ("RAM"), magnetic memory such as a hard disk, floppy disk, and/or tape memory, a solid state drive ("SSD"), flash memory, phase change memory, and the like.

What is claimed is:

1. A computing device comprising:
a processor to:
receive a query associated with at least one of a database and a buffer storing streamed data from a data stream, the database storing database data previously stored in the buffer;
identify at least one postponed command received from the data stream and being relevant to the query, the at least one postponed command being delayed from execution and being associated with at least one of the database data and the streamed data;
generate a modified query based on the query and the at least one postponed command, the modified query being a modification of the query to account for the at least one postponed command;
process the modified query; and
provide a query result of the query based on the modified query being processed.

2. The computing device of claim 1, wherein the at least one postponed command is identified based on a range specified in the query.

3. The computing device of claim 2, wherein the range is at least one of a time range and a count range.

4. The computing device of claim 1, wherein the at least one postponed command includes at least one of an update command and a delete command.

5. The computing device of claim 1, wherein the modified query includes a database sub-query and a data stream sub-query, the database sub-query being processed based on the database and the at least one postponed command to generate a database sub-query result, the data stream sub-query being processed based on the data stream and the at least one postponed command to generate a data stream sub-query result, the query result being a combination of the database sub-query result and the data stream sub-query result.

6. The computing device of claim 1, wherein the at least one postponed command is postponed based on user-specified criteria.

7. A method comprising:
receiving, by a computing device, a query associated with at least one of a database and a buffer storing streamed data from a data stream, the database storing database data previously stored in the buffer;
determining, by the computing device, at least one postponed command relevant to the query, the at least one postponed command being associated with at least one of the database data and the streamed data;
creating, by the computing device, a modified query based on the query and the at least one postponed command, the modified query being a modification of the query to account for the at least one postponed command;
processing, by the computing device, the modified query; and
returning, by the computing device, a query result of the query based on the modified query being processed.

8. The method of claim 7, wherein the at least one postponed command includes at least one of an update command and a delete command.

9. The method of claim 7, wherein the modified query includes a database sub-query and a data stream sub-query, the database sub-query being processed based on the database and the at least one postponed command to generate a database sub-query result, the data stream sub-query being processed based on the data stream and the at least one postponed command to generate a data stream sub-query result, the query result being a combination of the database sub-query result and the data stream sub-query result.

10. The method of claim 7, wherein the at least one postponed command is postponed based on user-specified criteria.

11. A non-transitory machine-readable storage medium storing instructions that, if executed by at least one processor of a computing device, cause the computing device to:
receive a query associated with at least one of a database and a buffer storing streamed data from a data stream, the database storing database data previously stored in the buffer;
identify at least one postponed command relevant to the query, the at least one postponed command being associated with at least one of the database data and the streamed data;
generate a database sub-query and a data stream sub-query each based on the query and the at least one postponed command;
process the database sub-query and the data stream sub-query; and
provide a query result of the query, the query result being a combination of a database sub-query result of the database sub-query and a data stream sub-query result of the data stream sub-query.

12. The non-transitory machine-readable storage medium of claim 11, wherein the at least one postponed command is identified based on a range specified in the query.

13. The non-transitory machine-readable storage medium of claim 12, wherein the range is at least one of a time range and a count range.

14. The non-transitory machine-readable storage medium of claim 11, wherein the at least one postponed command includes at least one of an update command and a delete command.

15. The non-transitory machine-readable storage medium of claim 11, wherein the at least one postponed command is postponed based on user-specified criteria.

* * * * *